No. 730,627. PATENTED JUNE 9, 1903.
D. J. ESSER.
CARBURETER.
APPLICATION FILED AUG. 25, 1902.
NO MODEL.

WITNESSES:

INVENTOR
Daniel J. Esser
BY
ATTORNEYS.

No. 730,627. Patented June 9, 1903.

UNITED STATES PATENT OFFICE.

DANIEL J. ESSER, OF MAUCHCHUNK, PENNSYLVANIA.

CARBURETER.

SPECIFICATION forming part of Letters Patent No. 730,627, dated June 9, 1903.

Application filed August 25, 1902. Serial No. 120,955. (No model.)

*To all whom it may concern:*

Be it known that I, DANIEL J. ESSER, a citizen of the United States, and a resident of Mauchchunk, in the county of Carbon and State of Pennsylvania, have invented a new and Improved Carbureter, of which the following is a full, clear, and exact description.

The object of the invention is to provide a new and improved carbureter, which is simple and durable in construction, not liable to get out of order, perfectly safe, and arranged to effectively purify and enrich the gas to insure burning thereof with great economy and with a bright and clear light.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in both views.

Figure 1:
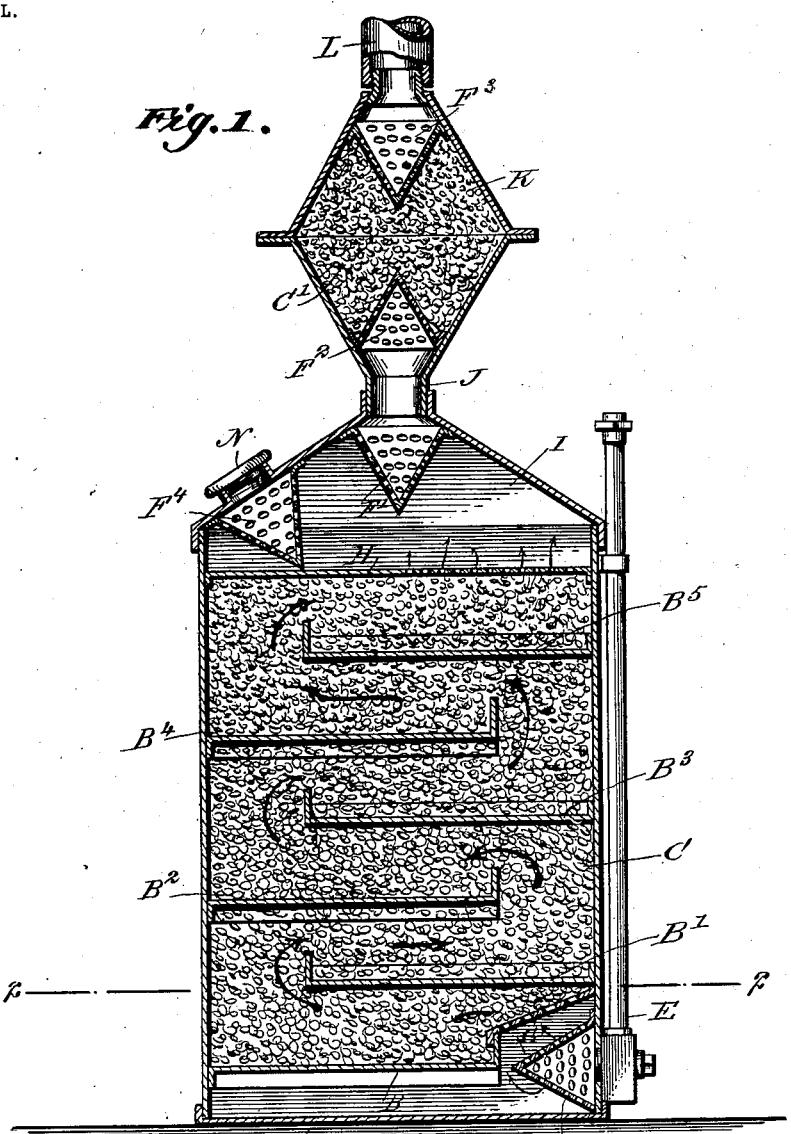
Figure 2:
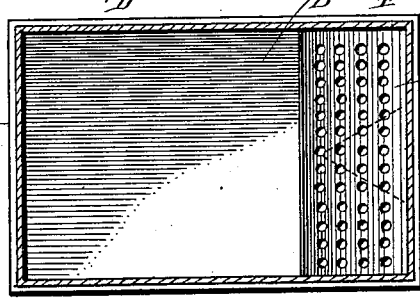

Figure 1 is a sectional side elevation of the improvement, and Fig. 2 is a sectional plan view of the same on the line 2 2 of Fig. 1.

In a suitably-constructed vessel A are arranged pans B, B', $B^2$, $B^3$, $B^4$, and $B^5$, located one above the other and containing charcoal C or other suitable filtering medium, the pans being alternately disposed from opposite sides to terminate at their free ends a distance from the opposite side of the receptacle A to form a zigzag passage in the said receptacle for the gas to travel through and at the same time pass through the charcoal or like filtering medium.

The lowermost pan B forms with the bottom of the receptacle A a gas-receiving chamber D, into which opens a gas-supply pipe E, connected with a suitable gas-supply, the entrance end of the pipe E into the chamber D being covered by a piece of gauze F to prevent accidental ignition of the gas. The free end of the lowermost pan B is connected by an upwardly and outwardly extending inclined plate G with the side of the receptacle A, from which the second pan B' starts, as plainly indicated in Fig. 1, so that the gas passing into the receiving-chamber D passes through the perforations in the plate G through the charcoal between the pans B and B'. The gas then travels through the charcoal between the pans B' and $B^2$, then through the charcoal between the pans $B^2$ $B^3$, then through the charcoal between the pans $B^3$ $B^4$, and finally through the charcoal between the pans $B^4$ $B^5$ to pass in a purified state through a plate H into an outlet-chamber I, formed in the top or dome of the receptacle A. The outlet-pipe J of the chamber I is covered by a piece of gauze F', and in the said pipe J is arranged a drier K, containing charcoal C', so that the gas passing through the drier K is freed of any remaining moisture and passes by a pipe L to the burners to be consumed or burned in the usual manner. The pipes J and L are covered by pieces of gauze $F^2$ and $F^3$, so as to prevent accidental ignition of the gas.

A screw-cap N is arranged in the top of the receptacle A and connects with the outlet-chamber I, so as to charge the same with an enriching medium, such as naphtha or the like, it being understood that the enriching medium can readily pass through the perforations in the plate H to the charcoal contained in the uppermost pan $B^5$. The enriching medium gravitates evenly through the charcoal from one pan to the other, and consequently the gradual enriching of the gas takes place as the latter passes through the charcoal from the chamber D to the chamber I. The screw-cap N is provided interiorly with a piece of gauze $F^4$, as shown in Fig. 1.

Now by the arrangement described the gas is caused to travel in a zigzag manner through the charcoal supported in the pans B, B', $B^2$, $B^3$, $B^4$, and $B^5$, and hence is thoroughly purified or filtered to produce a bright and clear light when burned.

The charcoal in lump or broken condition is saturated with naphtha or a like hydrocarbon previous to filling it into the vessel A and the pans B, B', $B^2$, $B^3$, $B^4$, and $B^5$, and then the so-charged charcoal is placed into the vessel and tamped therein to expel the air and prevent the formation of air pockets or spaces, so that when the gas circulates through the vessel the formation of explosive mixtures is prevented and the device rendered perfectly safe.

By having the pans arranged in the vessel as described the naphtha periodically introduced at the chamber I slowly overflows from one pan to another, and is thus prevented from passing directly to the bottom or lowermost pan B, and hence an even saturation of the entire mass of charcoal is produced. The charcoal C' in the drier K is not charged with naphtha, but is filled in dry, so as to absorb any moisture that may be in the enriched gas, to render the latter as dry as possible, and thereby prevent settling of moisture in the service-pipes.

I have found by experience that it requires about six quarts of naphtha for one thousand cubic feet of gas to form a gas of a high quality.

Having thus described my invention, I claim as new and desire to secure by Letters Patent—

1. An apparatus of the class described, comprising a receptacle adapted to contain a filtering medium through which a hydrocarbon percolates, said receptacle being provided in its bottom with a receiving-chamber having a portion of its top perforated, an outlet-chamber in its top having its bottom perforated at one side, and intermediate of the said chambers with pans arranged one above the other and forming a zigzag passage for the gas, as set forth.

2. An apparatus of the class described, comprising a receptacle adapted to contain a filtering medium through which a hydrocarbon percolates, said receptacle being provided in its bottom with a receiving-chamber having a portion of its top perforated, an outlet-chamber in its top having its bottom perforated at one side, and intermediate of said chambers with pans arranged one above the other, and extending alternately from opposite sides to form a zigzag passage for the gas, and a drier arranged above the outlet-chamber and through which the gas from the outlet-chamber passes, as set forth.

3. An apparatus of the class described, comprising a receptacle adapted to contain charcoal through which a hydrocarbon percolates, said receptacle being provided in its bottom with a receiving-chamber having a portion of its top perforated and an inlet below the said perforated portion of its top, an outlet-chamber having its bottom perforated at one side, and intermediate of said chambers with a plurality of pans arranged one above the other and extending alternately from opposite sides of the receptacle to form a zigzag passage for the gas, and a receptacle on top of the main receptacle and communicating with the outlet-chamber, said second receptacle being adapted to contain charcoal, as set forth.

4. An apparatus of the class described, comprising a receptacle, charcoal-pans held in the receptacle one above the other and extending alternately from opposite sides of the receptacle to within a distance from the other side thereof, to form a zigzag passage through the receptacle, a receiving-chamber in the receptacle, below the lowermost pan, the said receiving-chamber being connected with a gas-supply and having a perforated plate extending from the free end of the pan to one side of the receptacle, and an outlet-chamber in the top of the receptacle, having its bottom perforated at one side, as set forth.

In testimony whereof I have signed my name to this specification in the presence of two subscribing witnesses.

DANIEL J. ESSER.

Witnesses:
 EUGENE I. SPANGLER,
 JESSE M. ESSER.